United States Patent [19]
Whitehead et al.

[11] Patent Number: 5,999,307
[45] Date of Patent: Dec. 7, 1999

[54] METHOD AND APPARATUS FOR CONTROLLABLE FRUSTRATION OF TOTAL INTERNAL REFLECTION

[75] Inventors: Lorne A. Whitehead; J. Thomas Tiedje; Robin John Noel Coope, all of Vancouver, Canada

[73] Assignee: The University of British Columbia

[21] Appl. No.: 08/923,431

[22] Filed: Sep. 4, 1997

[51] Int. Cl.$^6$ .............................. G02B 26/08; G02F 1/29
[52] U.S. Cl. ...................... 359/298; 359/222; 359/318; 359/320
[58] Field of Search ................................ 359/222, 298, 359/318, 320, 896; 156/155

[56] References Cited

U.S. PATENT DOCUMENTS

| | | | |
|---|---|---|---|
| 3,291,554 | 12/1966 | Price | 359/222 |
| 3,556,638 | 1/1971 | Banks et al. | 359/222 |
| 3,571,511 | 3/1971 | Myer | 359/222 |
| 3,698,793 | 10/1972 | Tellerman | 359/290 |
| 3,746,785 | 7/1973 | Goodrich | 359/291 |
| 3,796,480 | 3/1974 | Preston, et al. | 359/295 |
| 4,135,960 | 1/1979 | Shuppert et al. | 427/152 |
| 4,156,745 | 5/1979 | Hatzakis et al. | 430/296 |
| 4,165,155 | 8/1979 | Gordon et al. | 359/222 |
| 4,249,814 | 2/1981 | Hull et al. | 396/457 |
| 4,324,456 | 4/1982 | Dalisa | 359/296 |
| 4,448,622 | 5/1984 | Duchane et al. | 156/155 |
| 4,714,326 | 12/1987 | Usui et al. | 359/222 |
| 5,045,847 | 9/1991 | Tarui et al. | 345/207 |
| 5,147,519 | 9/1992 | Legge | 204/192.29 |
| 5,221,987 | 6/1993 | Laughlin | 359/222 |
| 5,235,463 | 8/1993 | Broussoux et al. | 359/642 |
| 5,301,009 | 4/1994 | Shurtz, II | 359/487 |
| 5,319,491 | 6/1994 | Selbrede | 359/291 |
| 5,425,710 | 6/1995 | Khair et al. | 604/96 |
| 5,455,709 | 10/1995 | Dula, III et al. | 359/245 |
| 5,555,327 | 9/1996 | Laughlin | 359/222 |
| 5,555,558 | 9/1996 | Laughlin | 385/16 |
| 5,561,541 | 10/1996 | Sharp et al. | 359/886 |
| 5,566,260 | 10/1996 | Laughlin | 385/16 |
| 5,841,916 | 11/1998 | Laughlin | 359/122 |

FOREIGN PATENT DOCUMENTS

| | | |
|---|---|---|
| 204427A | 12/1986 | European Pat. Off. . |
| 728799/A1 | 8/1996 | European Pat. Off. . |
| 797127A | 9/1997 | European Pat. Off. . |
| 3720861A | 3/1989 | Germany . |
| 54-057576 | 5/1979 | Japan . |
| 59-078816 | 5/1984 | Japan . |
| 60-038130 | 2/1985 | Japan . |
| 2265024A | 9/1993 | United Kingdom . |

OTHER PUBLICATIONS

Neufeldt, Victoria. Webster's New World Dictionary of American English Third College Edition. Webster's New World, New York, p. 857, Dec. 31, 19–8.

"Surface Property Changes Induced in Poly(1–Hexene) Elastomer By High Energy Ion Irradition", Carlson et al, Proc. 4th Intl. Conf. on Ion Beam Modification of Materials, Ithaca, NY,Jul. 16–20, 1984. pp. 507–512.

"Patented fiber switch revs speed, cuts cost", George Kotelly, in "Lightwave" Oct, 1995 Web site publication of PennWell Publishing Co., Tulsa, OK.

"Elastomeric Light Valves", Qin et al, Advanced Materials 1997, 9, No. 5, pp. 407–410.

*Primary Examiner*—Cassandra Spyrou
*Assistant Examiner*—Jennifer Winstedt
*Attorney, Agent, or Firm*—Oyen Wiggs Green & Mutala

[57] ABSTRACT

A method and apparatus for facilitating controllable switching an interface between a reflective state in which light incident upon the interface undergoes total internal reflection, and a non-reflective state in which total internal reflection is prevented at the interface. The apparatus incorporates a member (preferably an elastomer) which is deformable with respect to the interface. The member's Young's Modulus in portions of the member adjacent the interface is substantially greater (i.e. stiffer) than the member's Young's Modulus in portions of the member away from the interface. The stiffened portion of the member adjacent the interface may be in the form of a microstructure. A pair of electrodes coupled to a voltage source can be provided to controllably deform the member into optical contact with the interface, within a continuously variable range of optical contact values, to produce the non-reflective state in selectably varying degrees.

1 Claim, 3 Drawing Sheets

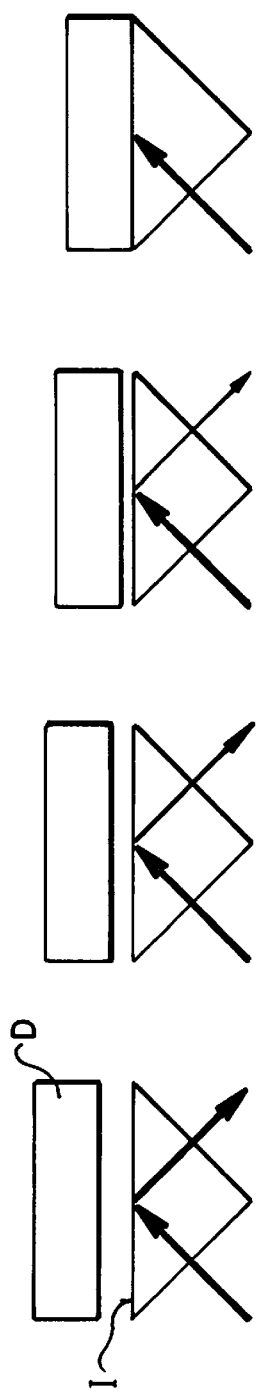
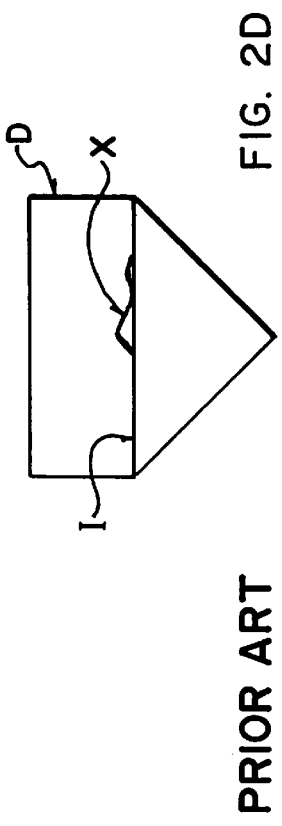
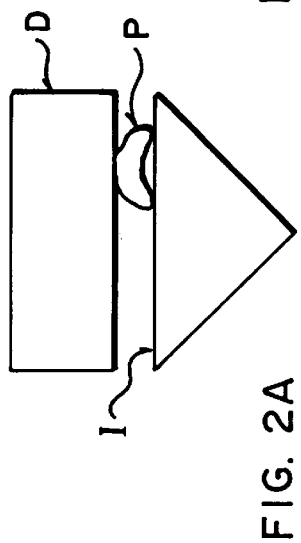
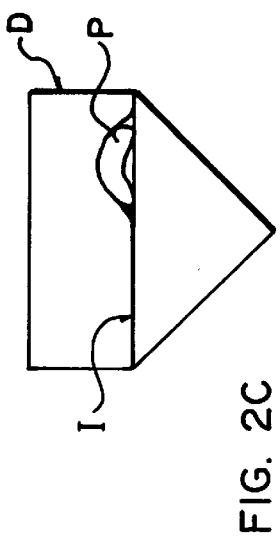

METHOD AND APPARATUS FOR CONTROLLABLE FRUSTRATION OF TOTAL INTERNAL REFLECTION

TECHNICAL FIELD

This application pertains to a method and apparatus for frustrating the phenomenon of total internal refection in a continuously variable, easily controllable manner.

BACKGROUND

It is well known that light travels at different speeds in different materials. The change of speed results in refraction. The relative refractive index between two materials is given by the speed of an incident light ray divided by the speed of the refracted ray. If the relative refractive index is less than one, then light will be refracted towards the surface, e.g. light emerging from a glass block into air. At a particular angle of incidence "i", the refraction angle "r" becomes 90° as the light runs along the block's surface. The critical angle "i" can be calculated, as sin i=relative refractive index. If "i" is made even larger, then all of the light is reflected back inside the glass block and none escapes from the block. This is called total internal reflection. Because refraction only occurs when light changes speed, it is perhaps not surprising that the incident radiation emerges slightly before being totally internally reflected, and hence a slight penetration (roughly one micron) of the interface, called "evanescent wave penetration" occurs. By interfering with (i.e. scattering and/or absorbing) the evanescent wave one may prevent (i.e. "frustrate") the total internal reflection phenomenon.

In a number of applications, it is desirable to controllably frustrate the phenomenon of total internal reflection. For example, if total internal reflection is occurring at an interface "I" as shown in FIG. 1A, the degree of reflection can be reduced by placing a dielectric material close to interface I such that dielectric D interacts with the evanescent wave penetrating beyond interface I, as shown in FIGS. 1B, 1C, and 1D, in which the extent of frustration of total internal reflection is gradually increased, culminating in complete frustration (FIG. 1D).

It is desirable that dielectric D be an elastomeric material. Inevitably, at least some foreign particles "P" (FIG. 2A) are trapped between dielectric D and interface I; and/or, the opposing surfaces of dielectric D and interface I have at least some dimensional imperfections "X" (FIG. 2B) which prevent attainment of a high degree of surface flatness over substantial opposing areas of both surfaces. Such foreign particles, or such surface imperfections, or both, can prevent attainment of "optical contact" between dielectric D and interface I. Optical contact brings dielectric D substantially closer than one micron to interface I, thereby scattering and/or absorbing the evanescent wave adjacent interface I, thus preventing the capability of interface I to totally internally reflect incident light rays. If dielectric D is formed of an elastomeric material, the aforementioned adverse effects of such foreign particles and/or surface imperfections are localized, thereby substantially eliminating their impact on attainment of the desired optical contact. More particularly, as seen in FIGS. 2C and 2D, the elastomeric nature of dielectric D allows dielectric D to closely conform itself around foreign particle P and around surface imperfection X, such that optical contact is attained between dielectric D and interface I except at points very close to foreign particle P and around surface imperfection X. Since such points typically comprise only a very small fraction of the opposing surface areas of dielectric D and interface 1, sufficiently substantial optical contact is attained to facilitate frustration of total internal reflection as described above.

However, if an elastomeric material makes optical contact with a surface, the elastomeric material tends to stick to that surface and it is difficult to separate the two. This is because elastomeric materials are sufficiently soft that the material can deform into intimate atomic contact with the atomic scale structure present at any surface; and, because the resultant Van der Waals bonds have sufficient adhesion that it is difficult to remove the material from the surface. These factors make it difficult to use an elastomeric material to frustrate the total internal reflection phenomenon; and, they make it especially difficult to use an elastomeric material to control or vary the degree of total internal reflection. It is desirable to control the degree of frustration of total internal reflection by varying an interfacial pressure applied between dielectric D and interface I; and, in general, it is desirable to achieve such control with the least possible amount of pressure. The aforementioned Van der Waals bonding can require negative pressures of order $10^4$ Pascals for release, which is desirably reduced. The present invention addresses the foregoing concerns.

SUMMARY OF INVENTION

The invention facilitates controllable switching of an interface between a reflective state in which light incident upon the interface undergoes total internal reflection, and a non-reflective state in which total internal reflection is prevented at the interface. This is achieved by providing an apparatus having a member which is deformable with respect to the interface. The member's Young's Modulus in portions of the member adjacent the interface is substantially greater than the member's Young's Modulus in portions of the member away from the interface. More particularly, $E > a/d$, where E is the member's Young's Modulus at portions of the member adjacent the interface, a is the bond energy per unit area due to the Van der Waals force between the interface and the member, and d is a dimension characteristic of roughness of the interface. Preferably, the member's Young's Modulus at portions of the member adjacent the interface is greater than about $10^6$ Pascals.

Advantageously, the member is an elastomer (preferably a silicone elastomer), although it is not essential for the member to be an elastomer; it is sufficient for the bulk dielectric material to be a reasonably flexible substance, such as Teflon™. The portions of the member adjacent the interface may be in the form of a microstructure on a face of the elastomer. Means such as a pair of electrodes coupled to a voltage source can be provided to controllably deform the member into optical contact with the interface, within a continuously variable range of optical contact values, to produce the non-reflective state.

The invention further provides a method of stiffening a selected surface portion of a (typically elastomer) member whereby the member's Young's Modulus in the selected portion is substantially increased with respect to the member's Young's Modulus in portions of the member other than the selected portion, the method comprising irradiating the selected portion with ultraviolet light. Advantageously, the irradiating step is performed in the presence of oxygen.

Another method is to apply a non-adhesive polymer coating having a preselected stiffness to a microstructured film, then apply elastomer to the polymer-coated microstructured film, and then dissolve the film, leaving the stiffened microstructure adherent to the elastomer.

BRIEF DESCRIPTION OF DRAWINGS

FIGS. 1A, 1B, 1C and 1D show various stages in frustration of the total internal reflection phenomenon at interface I as dielectric D is gradually moved toward interface I.

FIGS. 2A and 2B respectively depict a foreign particle P and a surface imperfection X preventing attainment of optical contact between interface I and dielectric D. FIGS. 2C and 2D respectively depict attainment of substantial optical contact between interface I and dielectric D notwithstanding foreign particle P or surface imperfection X if dielectric D is an elastomeric material.

FIG. 5 is a flowchart illustrating a stiffening method in accordance with the invention.

DESCRIPTION

Figure 3A:
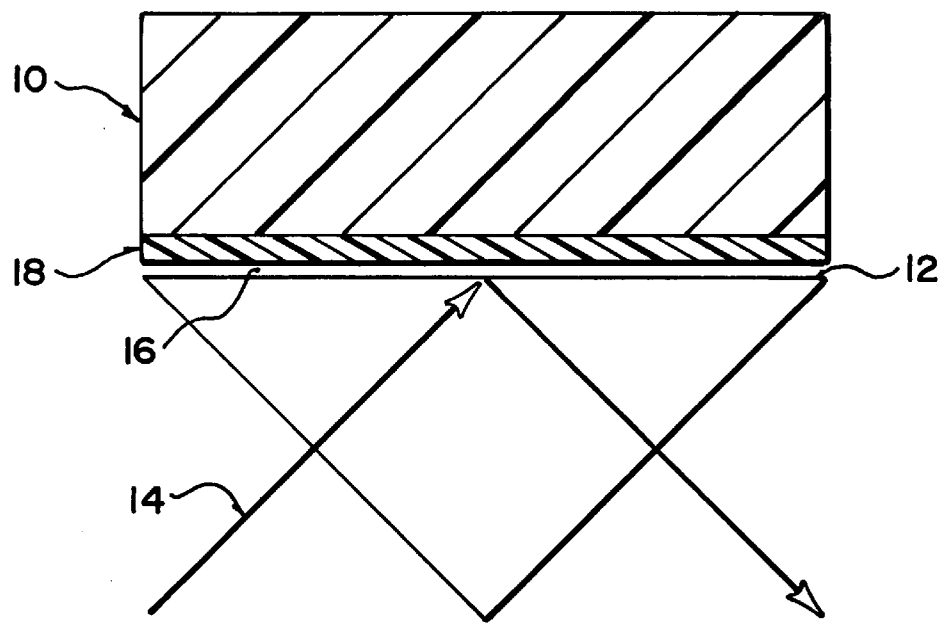
FIG. 3A depicts a stiff-surfaced elastomeric dielectric positioned adjacent an interface in accordance with one embodiment of the invention.

FIG. 3A depicts an elastomeric dielectric 10 positioned adjacent interface 12. Light rays 14 incident upon interface 12 are totally internally reflected because air gap 16 between the opposing surfaces of dielectric 10 and interface 12 is large enough to prevent optical contact between the opposing surfaces (i.e. gap 16 is substantially greater than one micron). As hereinafter explained, the Young's Modulus E of dielectric 10 varies as a function of distance from the surface of dielectric 10 adjacent interface 12, such that the portion 18 of dielectric 10 near the surface is substantially stiffer than in the remaining portions of dielectric 10.

The stiffened surface portion 18 of dielectric 10 prevents attainment of the aforementioned Van der Waals bonding between dielectric 10 and interface 12, since such bonding occurs only if dielectric 10 is sufficiently deformable. Roughly speaking, the Young's Modulus of a material (a measure of the material's stiffness) must be less than the Van der Waals bond energy per unit area divided by a characteristic dimension associated with the material's surface roughness, in order for substantial atomic contact to occur. For surfaces which are sufficiently smooth to exhibit total internal reflection, in which the characteristic dimension of the roughness is substantially less than one micron, sticking will occur if the Young's Modulus is less than about $10^6$ Pascals, which is the case for elastomeric materials. Hence, by increasing the Young's Modulus of elastomeric dielectric 10 at the surface of dielectric 10 one may stiffen that surface sufficiently to prevent sticking.

The aforementioned surface stiffening should be such that the surface of dielectric 10 can assist in achieving a predictable, reproducible degree of frustration of total internal reflection which varies as function of the pressure applied between dielectric 10 and interface 12. Preferably, under low positive interfacial pressure, there is very little frustration of total internal reflection, and air gap 16 retains a well defined average value of slightly over one micron. This is important, particularly if the interfacial pressure is to be created by electrostatic force, as such narrow air gaps can support large fields due to the "Paschen effect", and these large fields can be produced with fairly low voltages, due to the small gap.

One method of creating the desired surface characteristics in elastomeric dielectric 10 is to prepare a uniform, smooth-surfaced elastomeric material, and then treat that material in a manner which stiffens and/or textures a thin surface portion of the material. One acceptable technique is to irradiate the surface of a silicone elastomer with ultraviolet light. Although not wishing to be bound by any theory, the inventors note that such irradiation is typically performed in the presence of oxygen, so it may be that the combination of the ultraviolet light and the resultant ozone are important. The effect may be to increase cross-linking of polymer chains near the treated surface of the elastomer material, increasing the Young's Modulus in this region. However the precise nature of the effect(s) involved is uncertain.

Figure 3B:
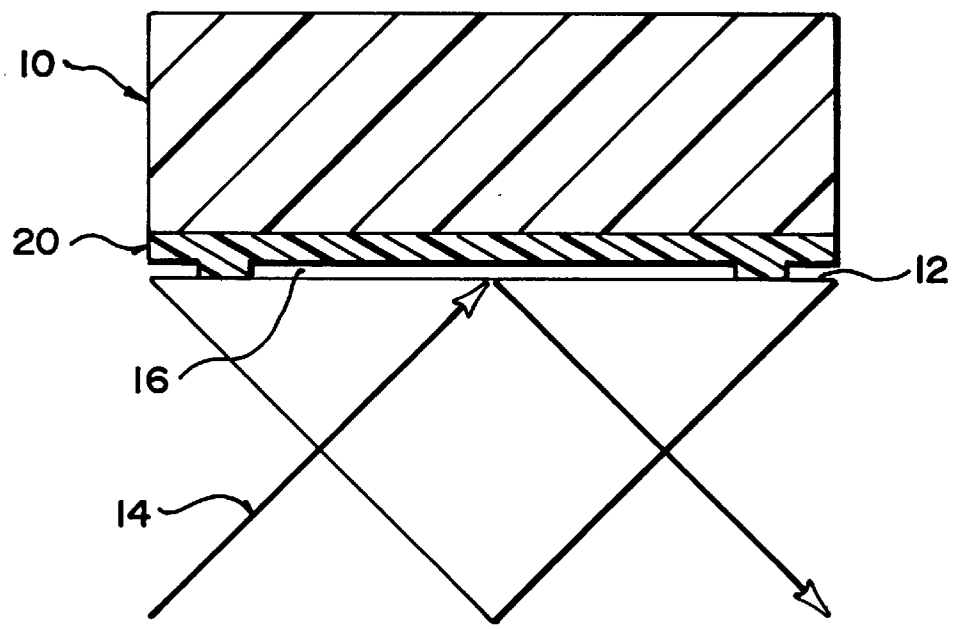
FIG. 3B depicts a stiff-surfaced, microstructured elastomeric dielectric positioned adjacent an interface in accordance with a further embodiment of the invention.

Another method (FIG. 5) is to separately apply a thin layer of stiff material to the surface of an elastomeric material. More particularly, a sacrificial microstructured film is coated with a thin non-sticky polymer having a preselected stiffness. One way of making such a coating is to spin cast liquid poly-methyl-methacrylate ("PMMA") which then polymerizes to yield a sub-micron thick coating; while another way is to vacuum deposit parylene on the film. Elastomer is then cast against the PMMA. The sacrificial film is then dissolved by a solvent which does not attack the coating or the elastomer, leaving the microstructured surface adherent to the elastomeric material. FIG. 3B depicts such a stiffened microstructured surface 20 bonded to elastomeric dielectric 10.

Figure 3C:
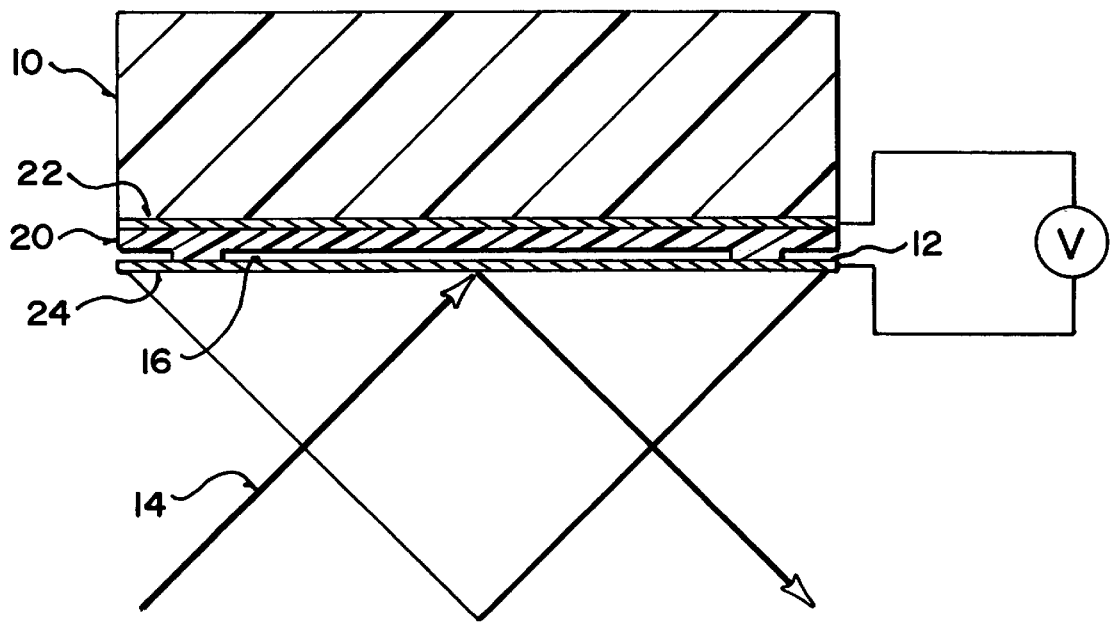
FIG. 3C is similar to FIG. 3B and shows a pair of electrodes for controllably deforming the microstructured elastomeric dielectric toward the adjacent interface.
Figure 4:
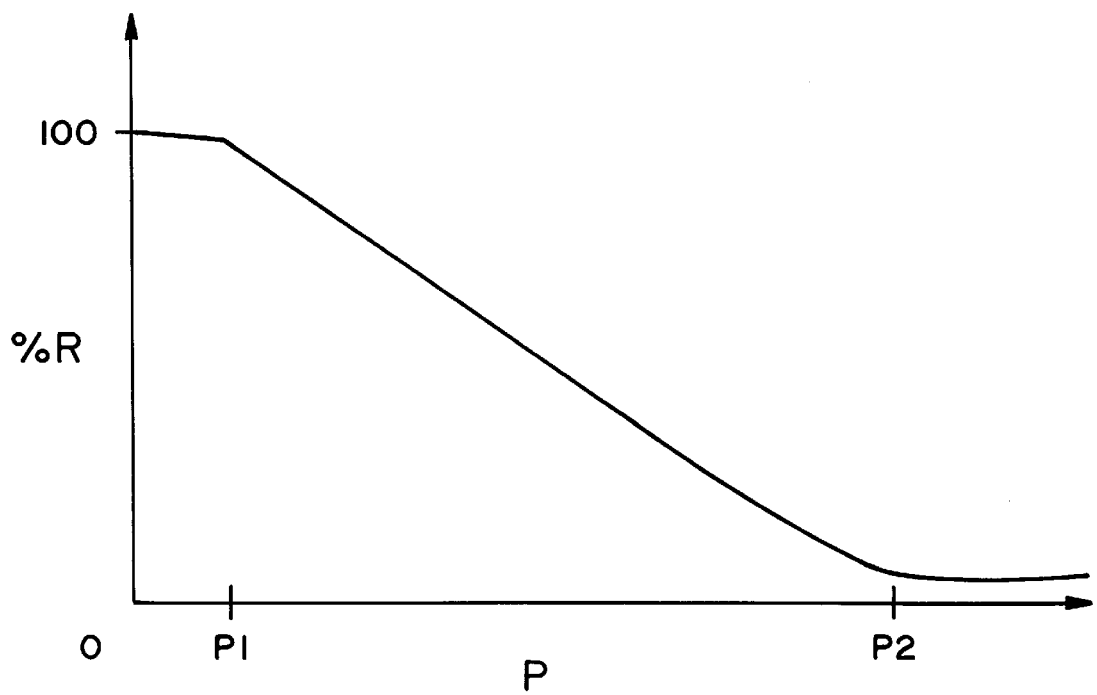
FIG. 4 is a graph on which percentage reflectivity is plotted as a function of pressure applied between the elastomeric dielectric and the interface of FIG. 3.

A further desirable property of the FIG. 3B structure is that gradual increase of the pressure will yield gradual frustration of total internal reflection. This is illustrated in FIG. 3C, which depicts a first electrode 22 bonded between stiffened microstructured surface 20 and the remaining flexible portion of dielectric 10; and, a second electrode 24 bonded to interface 12. A voltage source "V" is electrically coupled between electrodes 22, 24. By suitably varying the voltage applied between electrodes 22, 24 one may deform dielectric 10 and its stiffened microstructured surface 20 toward interface 12 within a continuously variable range of optical contact values, thereby attaining any desired degree of frustration of the capability of interface 12 to totally internally reflect incident light rays. FIG. 4 graphically illustrates the resultant range of reflectivity.

As will be apparent to those skilled in the art in the light of the foregoing disclosure, many alterations and modifications are possible in the practice of this invention without departing from the spirit or scope thereof. For example, although dielectric 10 is preferably a silicone elastomer, it need not necessarily be an "elastomer"; it is sufficient for the bulk dielectric material to be a reasonably flexible substance, such as Teflon™. Accordingly, the scope of the invention is to be construed in accordance with the substance defined by the following claims.

What is claimed is:

1. Apparatus for controllably switching an interface between a reflective state in which light incident upon said interface undergoes total internal reflection and a non-reflective state in which said total internal reflection is prevented at said interface, said apparatus comprising a member deformable with respect to said interface, said member's Young's Modulus in portions of said member adjacent said interface being substantially greater than said member's Young's Modulus in portions of said member away from said interface, wherein $E > a/d$, where E is said member's Young's Modulus at portions of said member adjacent said interface, a is the bond energy per unit area due to the Van der Waals force between said interface and said member, and d is a dimension characteristic of roughness of said interface.

* * * * *